United States Patent [19]
Ishikawa et al.

[11] Patent Number: 5,862,264
[45] Date of Patent: Jan. 19, 1999

[54] IMAGE COMPRESSION DEVICE AND IMAGE COMPRESSION METHOD FOR COMPRESSING IMAGES BY SMOOTHING THEM, REVERSIBLY COMPRESSING THE RESIDUAL IMAGES AND COMPRESSING THE SMOOTHED IMAGES BASED ON FRACTAL THEORY

[75] Inventors: Atsushi Ishikawa, Okazaki; Masatoshi Tuneda, Yokohama; Shinji Yamamoto, Toyohashi, all of Japan

[73] Assignee: Minolta Co., Ltd., Osaka, Japan

[21] Appl. No.: 816,438

[22] Filed: Mar. 14, 1997

[30] Foreign Application Priority Data

Mar. 15, 1996 [JP] Japan .................................. 8-058696

[51] Int. Cl.⁶ ..................................................... G06T 9/00
[52] U.S. Cl. .......................... 382/249; 382/257; 382/260; 382/308
[58] Field of Search ..................................... 382/249, 266, 382/256, 257, 258, 260, 242, 308, 302, 251; 348/405; 358/432, 433

[56] References Cited

U.S. PATENT DOCUMENTS

| | | | |
|---|---|---|---|
| 4,941,193 | 7/1990 | Barnsley et al. | 382/249 |
| 5,065,447 | 11/1991 | Barnsley et al. | 382/249 |
| 5,148,497 | 9/1992 | Pentland et al. | 382/249 |
| 5,289,548 | 2/1994 | Wilson et al. | 382/250 |
| 5,497,435 | 3/1996 | Berger | 382/249 |
| 5,724,451 | 3/1998 | Shin et al. | 382/240 |

FOREIGN PATENT DOCUMENTS 5-130432  5/1992  Japan.
6-98310   4/1994  Japan.

OTHER PUBLICATIONS

Kim, Chang–Su, "Novel Fractal Image Compression Method with Non–Iterative Decoder", Sep., 1995, pp. 268–271.

Kim, Kwon, "Still Image Coding Based on Vector Quantization and Fractal Approximation", Apr., 1996, pp. 587–597.

*Primary Examiner*—Amelia Au
*Assistant Examiner*—David J. Rosenblum
*Attorney, Agent, or Firm*—Burns, Doane, Swecker & Mathis, LLP

[57] ABSTRACT

An image compression device comprises an image smoothing device which produces a smooth image by performing a smoothing process on an original image, an edge detection device which produces an edge image by subtracting said smoothed image from said original image, a fractal encoding device which encodes said smoothed image by fractal image compression, a reversible encoding device which encodes said edge image by reversible image compression, and an output device which combines the output of said fractal encoding means and the output of said reversible encoding means, and outputs said data as compressed data of the original image.

10 Claims, 16 Drawing Sheets

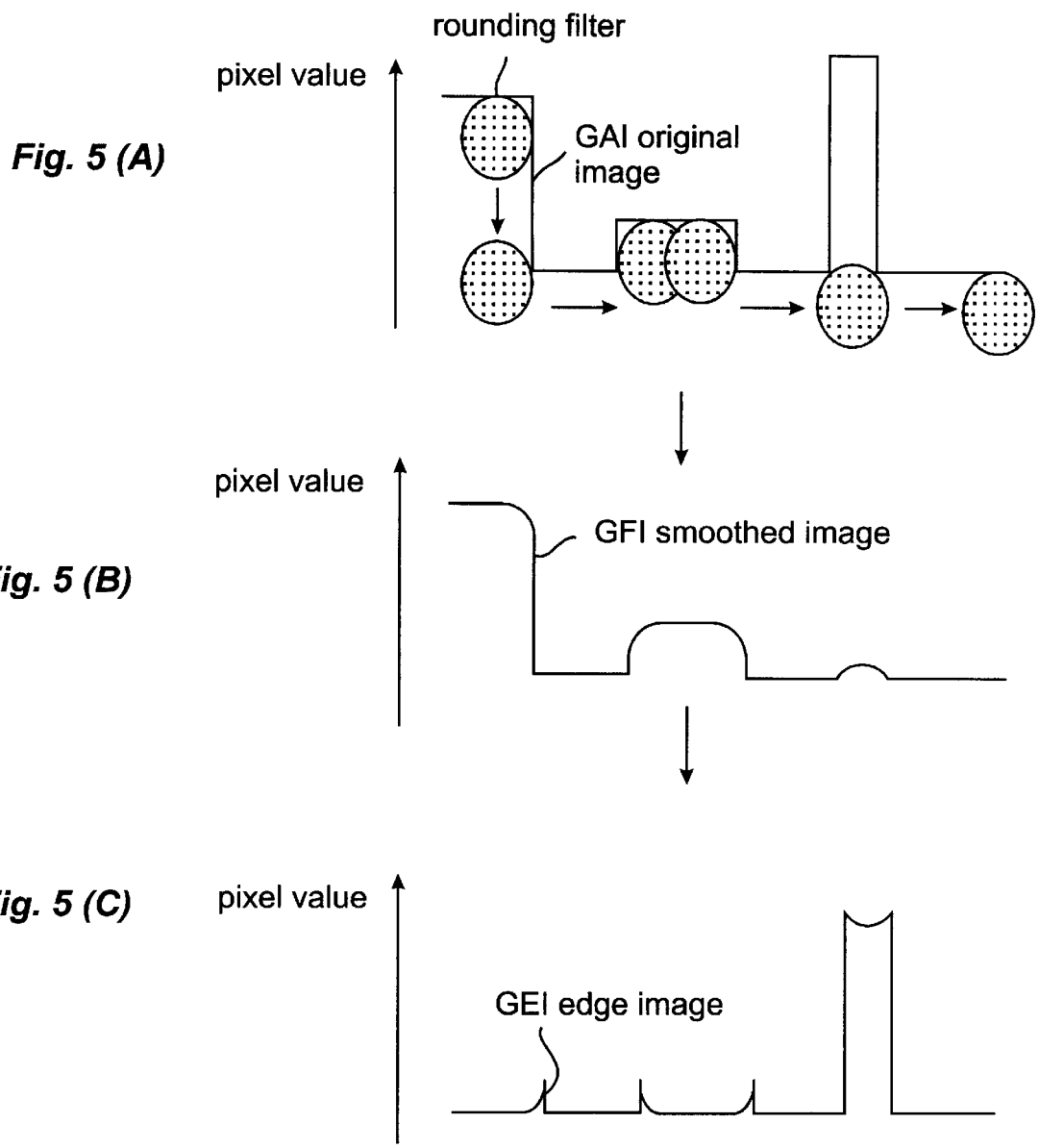

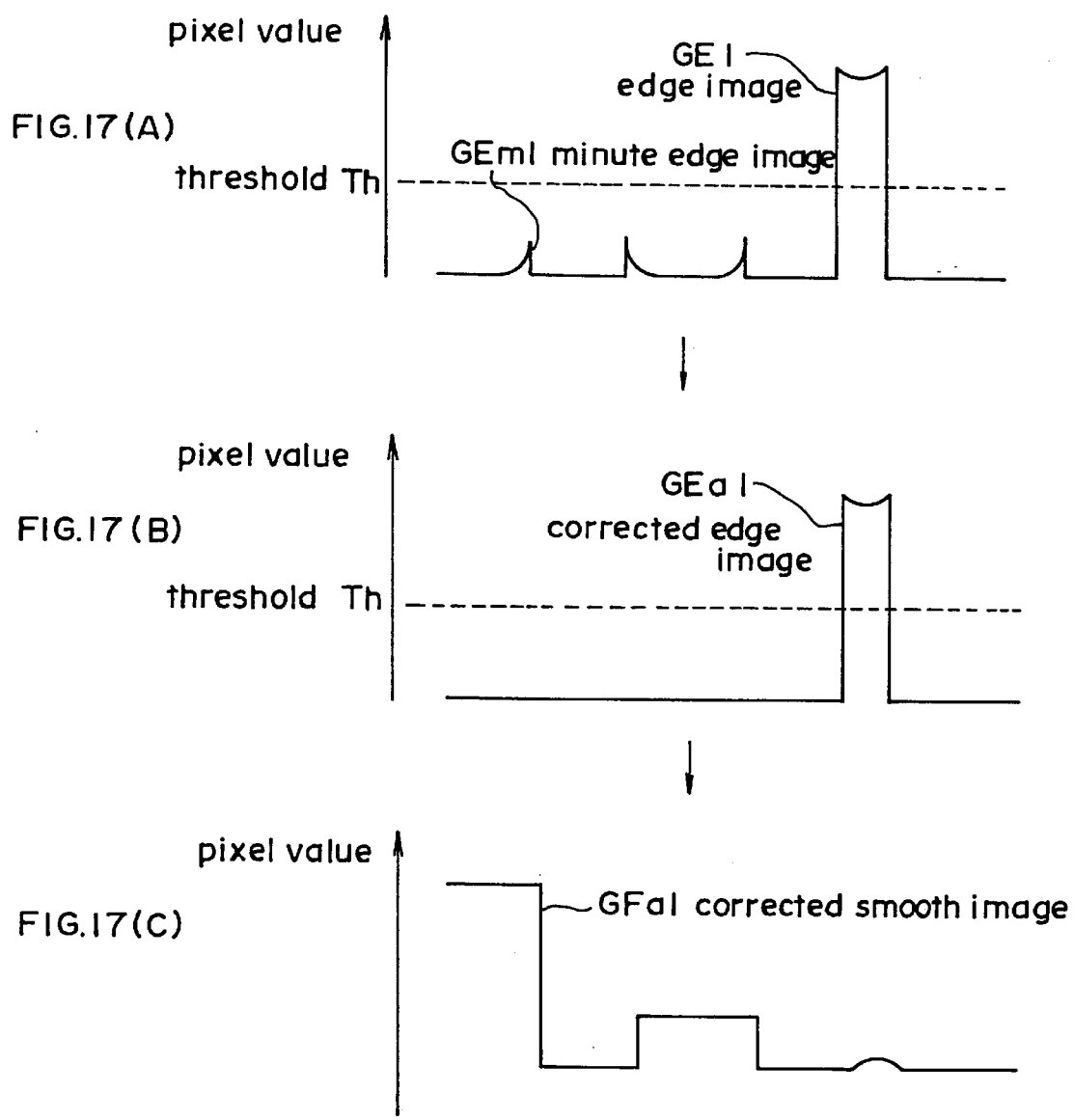

IMAGE COMPRESSION DEVICE AND IMAGE COMPRESSION METHOD FOR COMPRESSING IMAGES BY SMOOTHING THEM, REVERSIBLY COMPRESSING THE RESIDUAL IMAGES AND COMPRESSING THE SMOOTHED IMAGES BASED ON FRACTAL THEORY

DETAILED DESCRIPTION OF THE INVENTION

1. Field of the Invention

The present invention relates to an image compression device and image compression method, and specifically relates to a device and method for compressing images based on fractal theory for compressing multilevel images based on fractal theory.

2. Description of the Related Art

Image compression technology is a key technology in the realization of the era of multimedia computer programs. Although the Joint Photographic Experts Group (JPEG) is associated with current image compression technology. However, the fractal image compression prepared by Dr. Barnsley of Iterated systems, Inc., is among the compression technologies that have earned particular interest recently. Fractal image compression is a method which uses partial similarities within a natural image. That is, when a part of a particular original image is extracted, another image similar to the extracted image may be considered as existing at a different size and location within the original image. An original image is divided into a plurality of blocks and encoded and compressed by similarities among said blocks using partial similarities, and conversely an image compressed by such means can be restored so as to reproduce the original image. Fractal image compression is advantageous inasmuch as image restoration is not dependent on resolution because this method uses partial similarities among blocks of different sizes within the image, unlike other compression methods. Thus, the fractal image compression method is advantageous in that image quality does not deteriorate when an image is output to a device having a different resolution, unlike other compression methods, and is particularly desirable in the era of multimedia applications.

Publications relating to such fractal image compression include, for example, Japanese Unexamined Patent Application No. HEI 6-98310.

As mentioned above, fractal image compression uses partial similarities of an original image, selects the image of a domain block within an original image most similar to the image of a range block within the original image and encodes said image, and conversely restores an image of a range block based on the image of a domain block. Accordingly, an original image cannot be adequately restored when there are no similar areas within an original image. A further disadvantage is that the image quality of a restored image may decrease due to poor reproducibility of edge areas when an image contains high contrast edge areas such as in the case of text images within an original image.

SUMMARY OF THE INVENTION

In view of the aforesaid information, an object of the present invention is to provide an improved fractal image compression device and fractal image compression method.

A further object of the present invention is to provide an image compression device capable of suppressing a decrease in image quality of restored images by providing excellent restoration characteristics of edge areas even in the case of a high contrast edge areas such as text images within an original image.

These objects are attained by an image compression device comprising:
  image smoothing means to produce a smooth image by performing a smoothing process on an original image;
  edge detection means to produce an edge image by subtracting said smoothed image from said original image;
  fractal encoding means to encode said smoothed image by fractal image compression; and
  reversible encoding means to encode said edge image by reversible image compression.

The aforesaid objects are attained by providing an image compression device comprising:
  image smoothing means to produce a smooth image by performing a smoothing process on an original image;
  edge detection means to produce an edge image by subtracting said smoothed image from said original image;
  corrected edge image generating means to detect minute edge images comprising pixels having density values smaller than a predetermined threshold value relative to the density value of each pixel of the edge image, and generate a corrected edge image by erasing said minute edge images from the edge image;
  corrected smooth image generating means to generate a corrected smooth image by adding said minute edge images to the smoothed image;
  fractal encoding means to encode said corrected smoothed image by fractal image compression;
  reversible encoding means to encode said corrected edge image by reversible image compression; and
  output means to combine the output of said fractal encoding means and the output of said reversible encoding means, and output said data as compressed data of the original image.

The aforesaid objects are attained by providing an image compression method comprising the steps of:
  an image smoothing step to produce a smoothed image by performing a smoothing process on an original image;
  an edge detection step to produce an edge image by subtracting said smoothed image from the original image;
  a fractal encoding step to encode said smoothed image by fractal image compression;
  a reversible encoding step to encode said edge image by reversible image compression;
  an output step to combine the output of said fractal encoding step and the output of said reversible encoding step and outputting said data as compressed data of said original image.

The aforesaid objects of the invention are attained by providing an image compression method comprising the steps of:
  an image smoothing step to produce a smoothed image by performing a smoothing process on an original image;
  an edge detection step to produce an edge image by subtracting said smoothed image from the original image;
  a corrected edge image generating step to detect minute edge images comprising pixels having density values smaller than a predetermined threshold value relative to the density value of each pixel of the edge image, and generate a corrected edge image by erasing said minute edge images from the edge image;

a corrected smooth image generating step to generate a corrected smooth image by adding said minute edge images to the smoothed image;

a fractal encoding step to encode said corrected smooth image by fractal image compression;

a reversible encoding step to encode said corrected edge image by reversible image compression; and an output step to combine the output of said fractal encoding step and the output of said reversible encoding step and outputting said data as compressed data of said original image.

BRIEF DESCRIPTION OF THE DRAWINGS

FIGS. 5A, 5B, and 5C illustrate the concept of the process for extracting the smoothed image and edge image from an original image;

FIG. 6 shows an example of a smoothing filter used in another embodiment of the smoothing process;

FIGS. 17A, 17B, and 17C illustrate the concept of the threshold process.

DESCRIPTION OF THE PREFERRED EMBODIMENTS

The basic operation of fractal image compression is described hereinafter with reference to FIGS. 12 through 14.

Figure 12:
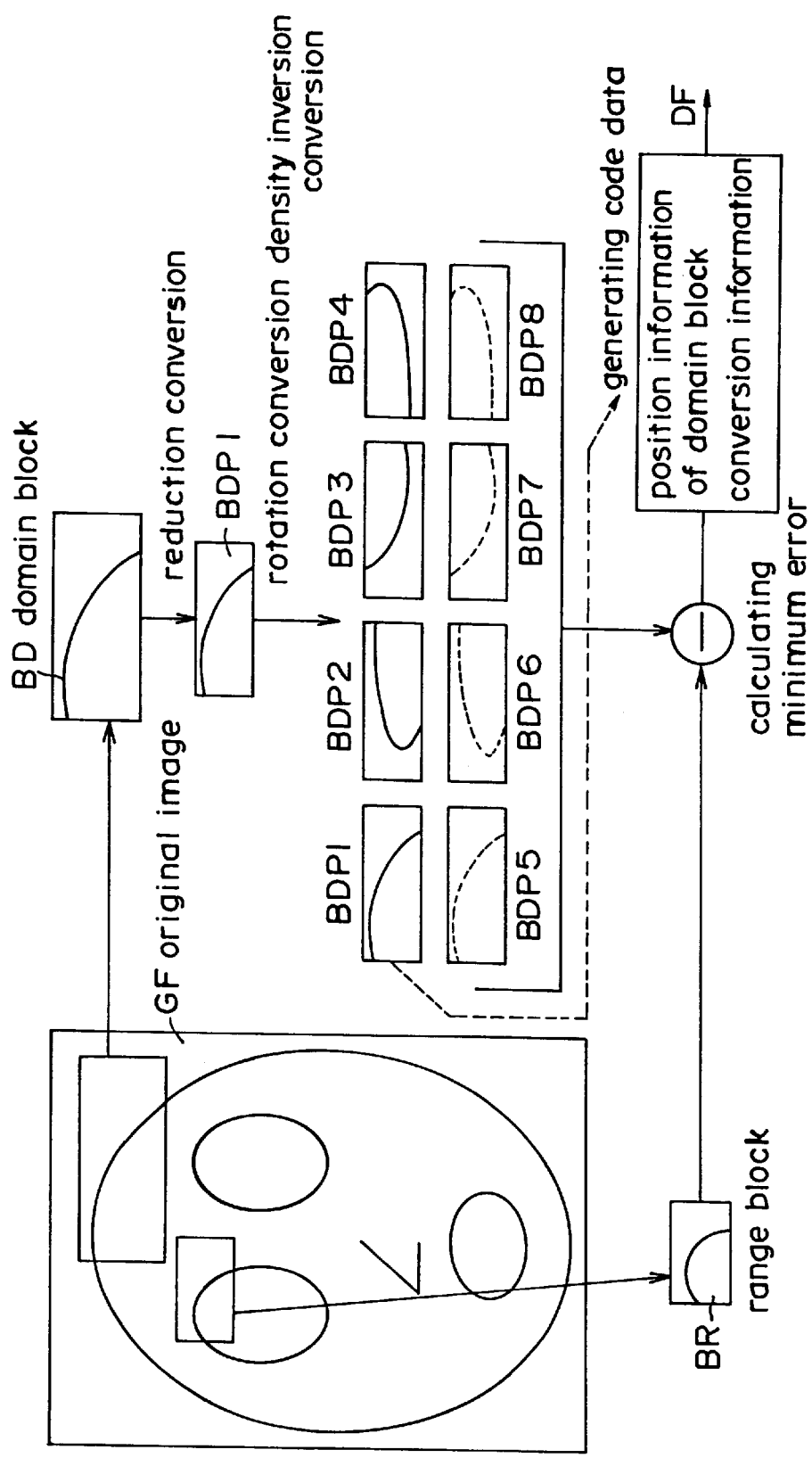
FIG. 12 briefly shows the fractal encoding process.
Figure 13:
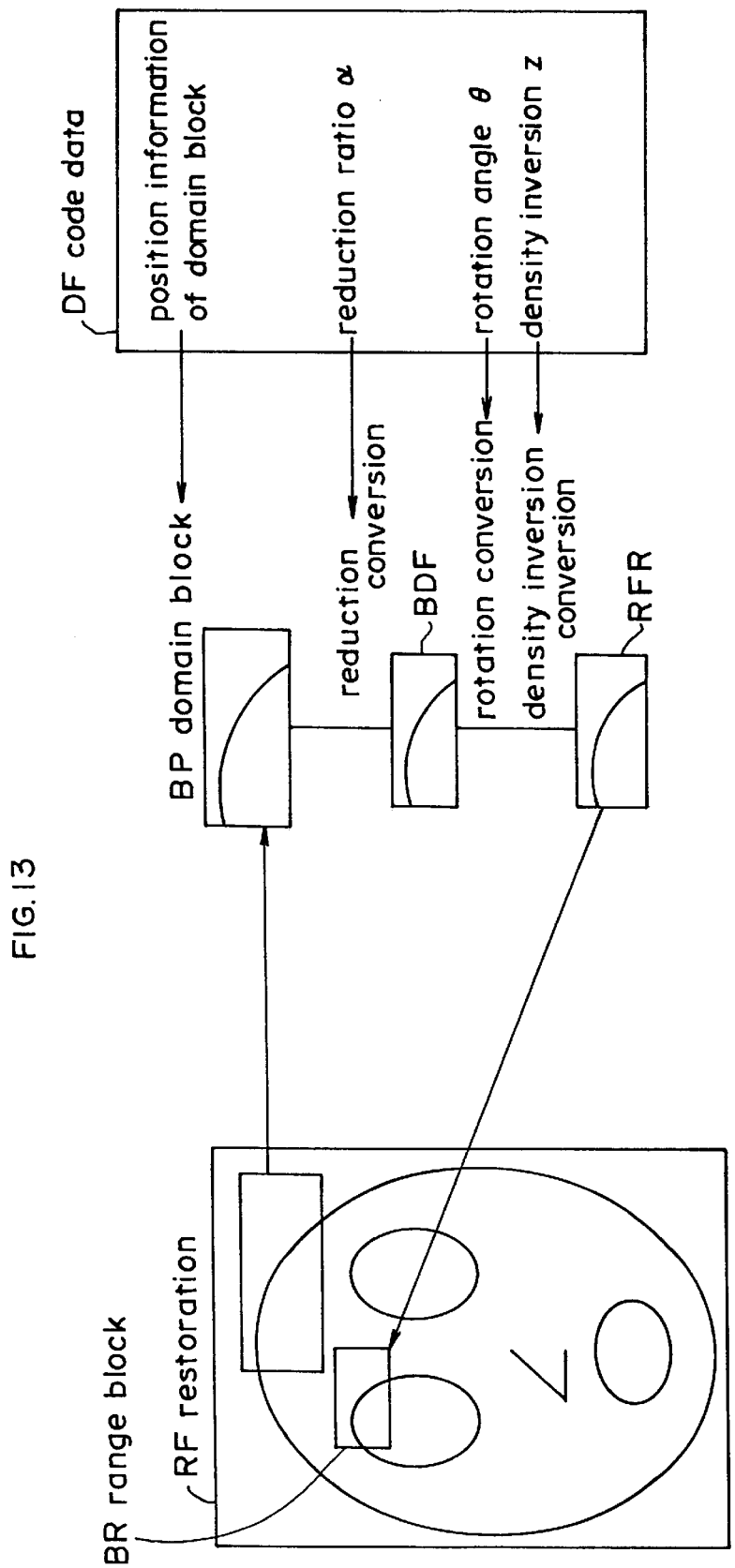
FIG. 13 briefly shows the decoding process of an image compressed by fractal image compression.
Figure 14:
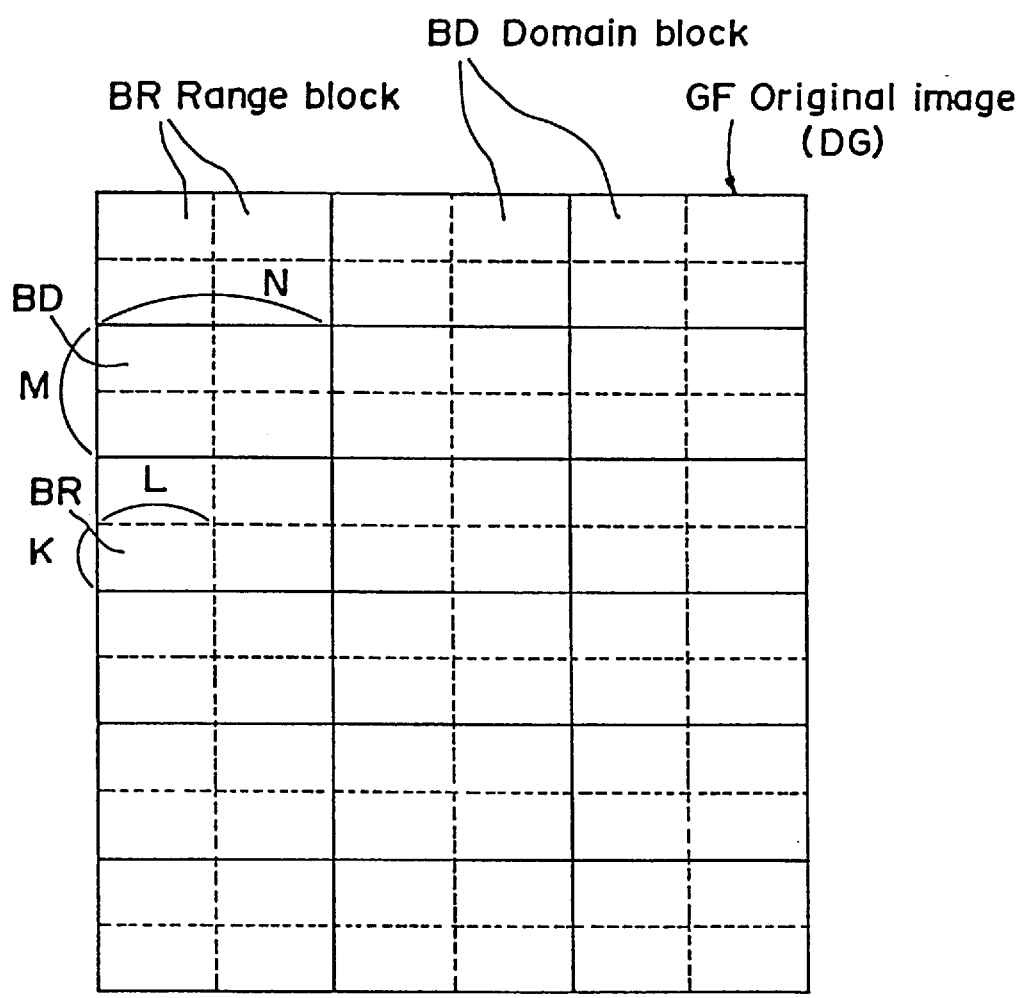
FIG. 14 shows the relationship between the domain block and the range block in a smoothed image of an original image produced by fractal encoding.

In FIGS. 12 through 14, a smoothed image GF is subjected to fractal image compression. The smoothed image GF is the original image used in fractal image compression, and is henceforth referred to as "original image GF." The original image GF is divided into a plurality of range blocks BR (block size: K×L), and a plurality of domain blocks BD (block size: M×N; M>K, N>L) larger in size than said range blocks BR. Compression pattern BDP1 is created in a size identical to range block BR by reduction conversion of domain block BD. A total of eight types of compression patterns BDP1~8 are obtained by subjecting the compression pattern BDP1 to rotation conversions of 0°, 90°, 180°, and 270°, and performing density inversion conversions on the obtained compression patterns BDP1~4.

Relative to one range block BR, each compression pattern BDP1~8 of all domain blocks BD are compared to calculate error, and the compression pattern BDP of the domain block having the smallest error is selected. Information relating to the position of the selected domain block BD within the original image GF and information relating to the compression pattern BDP conversion parameters (i.e., compression ratio, rotation angle, use of density conversion) are output as code data DF of the range block BR. In order to recreate the original image during restoration, the average value of the density of each range block BR is calculated, and included as pixel value information in the code data DF. Compressed code data for the original image GF are obtained by subjecting all range blocks BR to the aforesaid process.

When restoring the aforesaid code data DF, an optional initial image at the position of a domain block BD included in the code data DF is converted in accordance with the conversion parameters contained in said code data DF so as to produce an image of a decoded range block BR nearer to the original image than said initial image. Thus, a restored image near the original image GF can be produced by repeating the aforesaid process many times for the entire image.

The flow of the image compression process of the present invention is described below with reference to FIG. 1.

Figure 1:
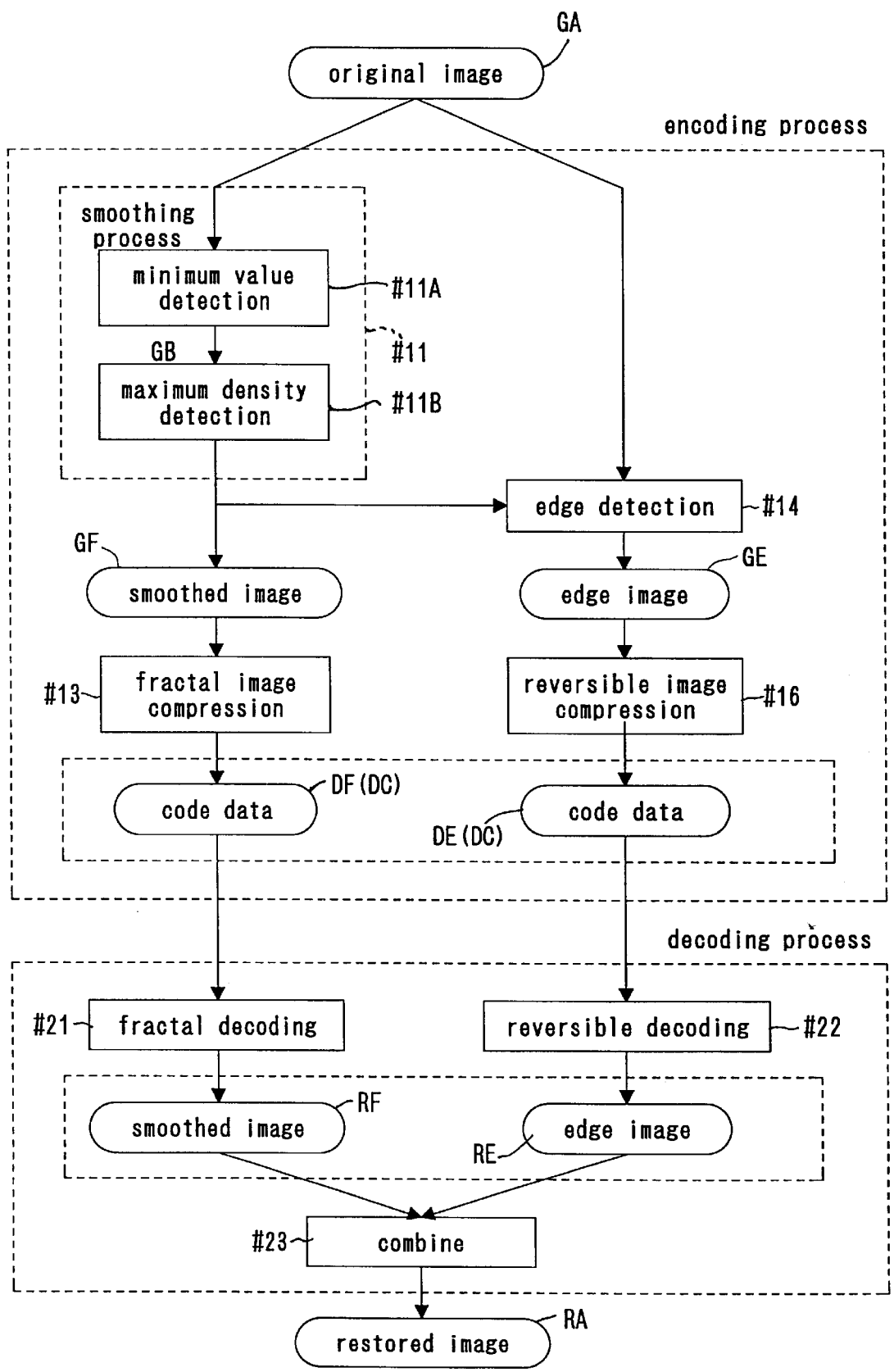
FIG. 1 shows the flow of the encoding process and decoding process of the present invention.

FIG. 1 illustrates the flow of the encoding process (image compression process) and decoding process (image restoration process) of the present invention.

In FIG. 1, the encoding process produces a smoothed image GF suitable for fractal image compression by means of a smoothing process performed on an original image GA (#11). As an example of the smoothing process, an original image GA is subjected to a minimum value detection process to set the minimum density of a target pixel and its surrounding pixels as the target pixel minimum density (#11A), and thereafter a maximum value detection process is performed to set the maximum density of the target pixel and its surrounding pixels as the target pixel maximum density, thereby producing a smoothed image GF (#11B). In the minimum density detection process and the maximum density detection process, the shape of neighboring area may be, for example, a square of dimensions n×n, or a circle excluding the vicinity of the corners of said square. The smoothed image GF is encoded by fractal image compression to obtain high compression ratio code data DF (#13).

Fractal image compression is an image compression means to compress and image using image similarities, wherein an original image is divided into a plurality of blocks, and the image is encoded according to the similarities among said blocks. There are various well known kinds of fractal image compression, and methods which include revisions and modifications of such methods.

The smoothed image GF is subtracted from the original image GA to accomplish edge detection. Thus, only the edge portions are extracted from the smoothed image GF to obtain edge image GE (#14). The edge image GE is encoded using widely known reversible image compression to obtain code data DE (#16). Reversible image compression methods include methods which combine, for example, the multi-level run length method and the Huffman encoding method. The combined code data DF and code data DE are the code data DC used as the compression data of original image GA. The final output may be sequentially output in units of code data DF and code data DE.

The various functions of the present invention such as image smoothing, edge detection, corrected edge image generation, corrected smoothed image generation, fractal encoding, reversible encoding, output and the like, are accomplished by circuits using hardware, or by software using microprocessing units (MPU), digital signal processors (DSP) or the like.

In the decoding process, fractal decoding is accomplished based on the code data DF obtained by fractal image compression to obtain a restored smoothed image RF (#21). Reversible decoding is accomplished based on the code data DE obtained by reversible image compression to obtain restored edge image RE (#22). The final restored image RE is obtained by combining the restored smoothed image RF and the restored edge image RE (#23).

Figure 2:
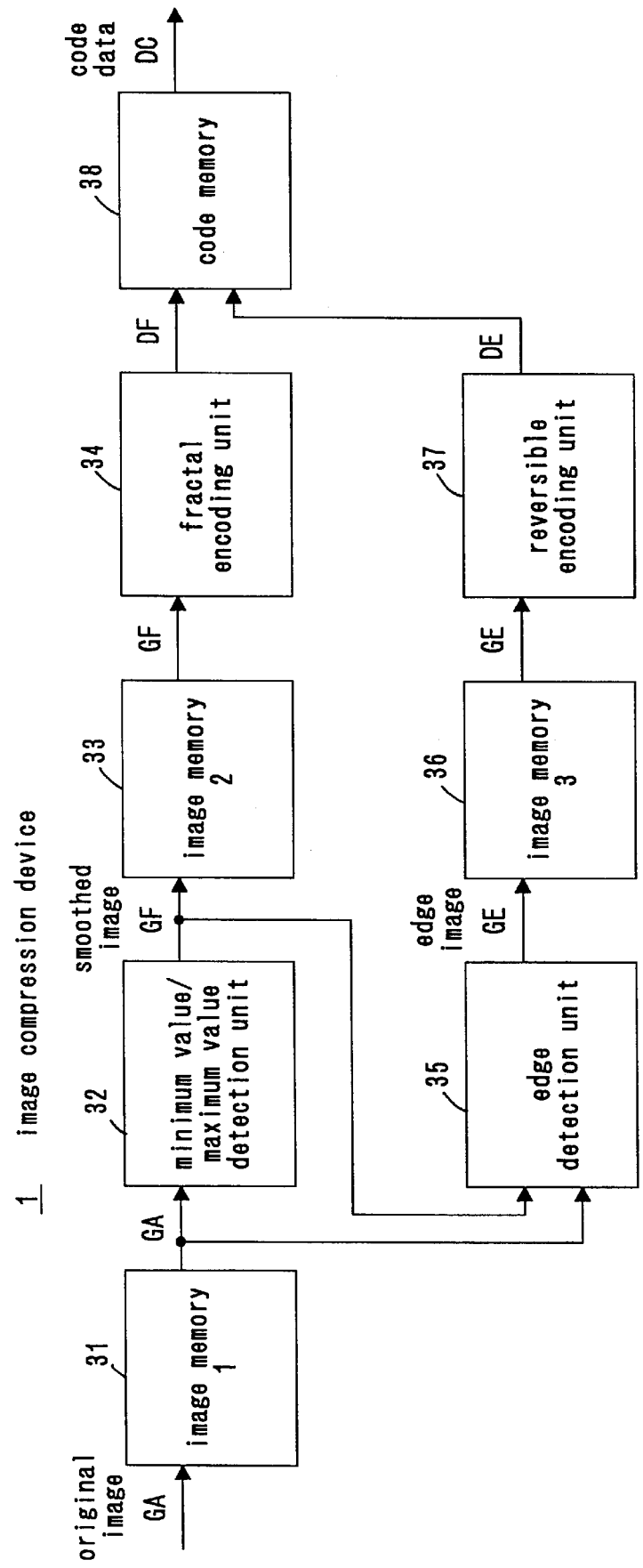
FIG. 2 is a block diagram showing the construction of the image compression device of the present invention.

FIG. 2 is a block diagram showing the construction of image compression device 1 of the present invention. On the sections of image compression device 1 relating to the encoding process are shown; sections relating to the decoding process are not shown. Sections relating to the decoding process may be included in image compression device 1, or may comprise a separate construction as an image restoration device.

Image compression device 1 comprises an image memory 31, minimum value/maximum value detection unit 32, image memory 33, fractal encoding unit 34, edge detection unit 35, image memory 36, reversible encoding unit 37, and code memory 38.

Image memory 31 receives image data read from a document, or receives from an external recording device or host, and stores said data as image data of original document GA. In the present specifications, the image data of original image GA is described in terms of units of original document GA.

Minimum value/maximum value detection unit 32 is a block executing the process of step #11 in FIG. 1 to obtain smoothed image GF from original image GA. The smoothed image GF is stored in image memory 33. Fractal encoding unit 34 is a block executing the process of step #13 in FIG. 1 to obtain code data DF by executing fractal image compression on the smoothed image GF. The code data DF are stored in code memory 38.

Edge detection unit 35 is a block executing the process of step #14 in FIG. 1 to obtain edge image GE by subtracting the smoothed image GF from the original image GA. Edge image GE is stored in image memory 36. Reversible encoding unit 37 performs reversible image compression on edge image GE to obtain code data DE. Code data DE are stored in code memory 38. The code data DF and code data DE are combined and output from code memory 38 as code data DC.

The image memories 31, 33, 36, and code memory 38 may be used individually, or different areas within a single memory may be used.

Figure 3A:
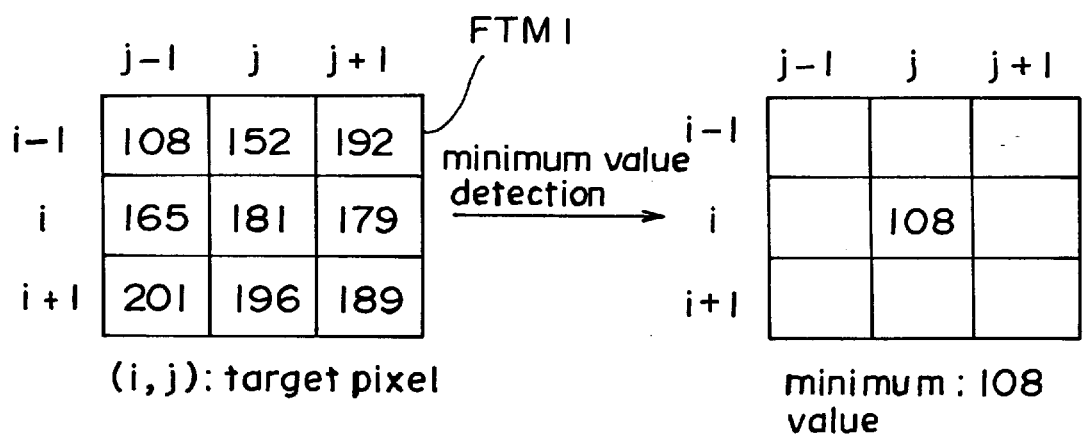
FIGS. 3A and 3B illustrate the processing operation of the maximum value/minimum value detection unit.
Figure 3B:
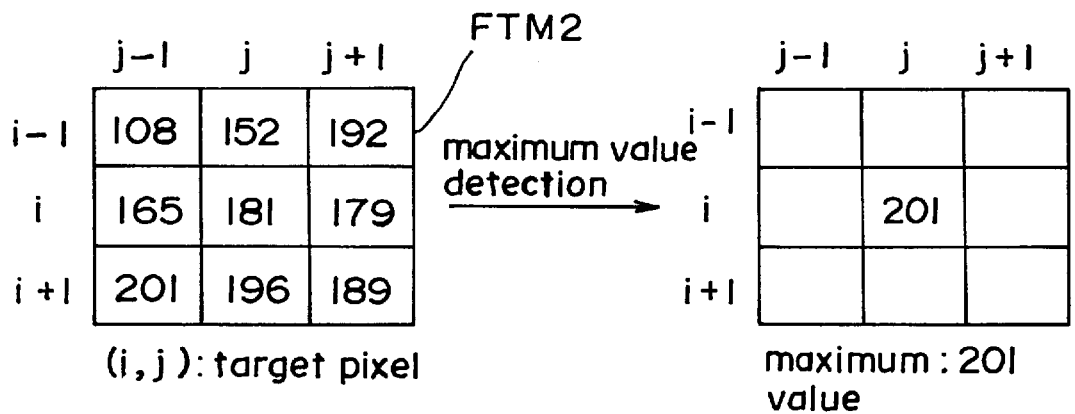

FIG. 3 illustrates the processing operation of the minimum value/maximum value detection unit 32. FIG. 3A shows the minimum value detection process, and FIG. 3B shows the maximum value detection process.

FIG. 3A shows a 3×3 pixel square matrix FTM1 Which includes a target pixel (i,j) and its surrounding pixels, and the density values (pixel value) of said pixels. The minimum density value (minimum value) is detected among the density values of the aforesaid matrix, and the detected minimum value is designated as the density value of target pixel (i,j). In the illustrated example, the minimum value is [108], which becomes the pixel value of the target pixel (i,j) in subsequent processing. This process is executed for all pixels of original image GA. The minimum value detection process replaces peripheral pixels around an imbalanced pixel having a low density with the pixel value of said low density value, and replaces peripheral pixels around an imbalanced pixel having a high density value with a minimum value among the peripheral pixels. Thus, black noise is eliminated from white background for example, and text areas of black text are replaced with white pixel values to make the text thinner.

FIG. 3B shows the 3×3 pixel square matrix FTM2 and its pixels similar to the one described above, wherein a maximum density (maximum value) is detected among said pixels, and the detected maximum value is set as the density of the target pixel (i,j). In the illustrated example, the maximum value is [201], which becomes the pixel value of the target pixel (i,j) in subsequent processing. This process is executed for all pixels of original image GA. The maximum value detection process replaces peripheral pixels around an imbalanced pixel having a high density with the pixel value of said high density value, and replaces peripheral pixels around an imbalanced pixel having a low density value with a maximum value among the peripheral pixels. Thus, for example, white noise is eliminated from black text, and black pixels are added to the periphery of black text to make the text thicker.

Ultimately, black noise is eliminated by the minimum value/maximum value detection unit 32, and the obtained smoothed image GF has pixels values in all cases equal to or smaller than the original image GA. Therefore, when the smoothed image GF is subtracted from the original image GA, the pixel values of all pixels of the obtained edge image GE are invariably positive values.

Figure 4:
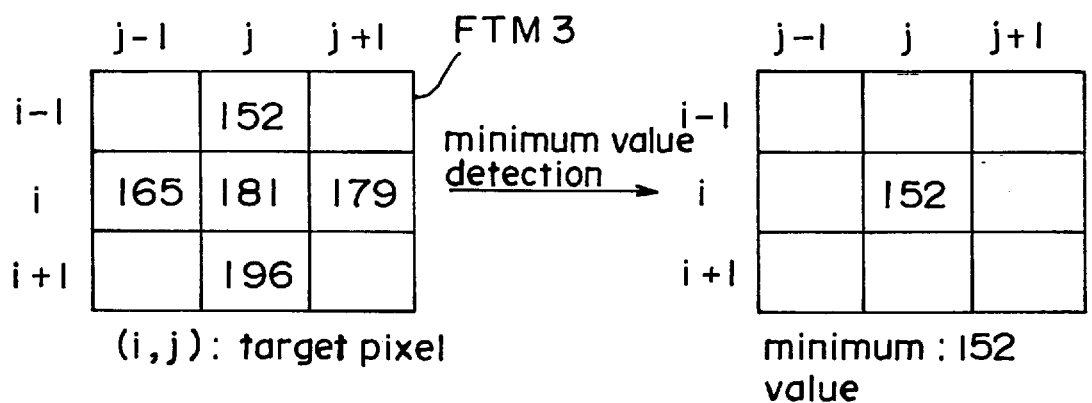
FIGS. 4A and 4B illustrate the processing operation of another embodiment of the maximum value/minimum value detection unit.
Figure 4:
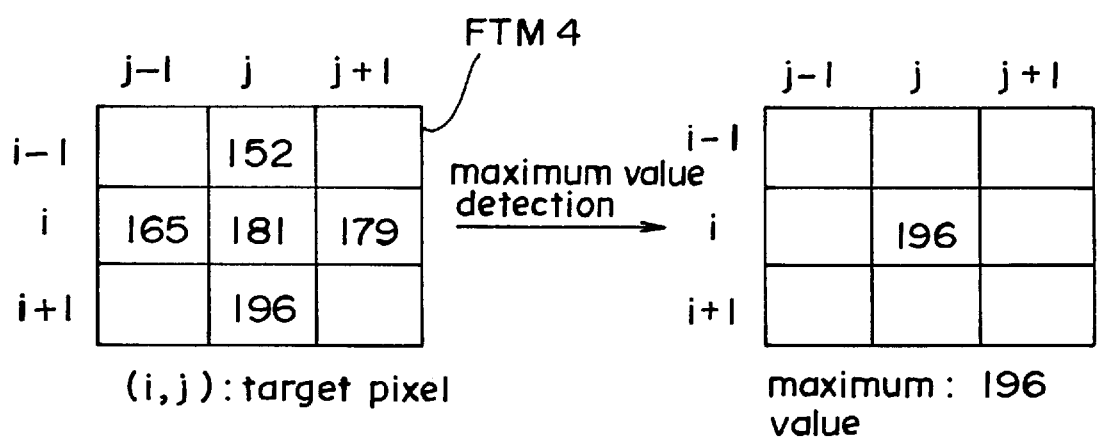

FIG. 4 shows the process of another embodiment of minimum value/maximum value detection unit 32. FIG. 4A shows the minimum value detection process, and FIG. 4B shows the maximum value detection process. Although a 3×3 pixel square matrix is used in FIG. 3, a 3-pixel diameter circular matrix is used in FIG. 4.

In FIG. 4A, shows a 5-pixel circular matrix FTM3 including a target pixel (i,j) and its peripheral pixels, and the respective pixel values. Within this matrix, the minimum value is detected, and the detected minimum value is set as the density value of the target pixel (i,j). In the illustrated example, the minimum value is [152], which becomes the pixel value of the target pixel (i,j) in subsequent processing. In FIG. 4B, the maximum value is detected in the circular matrix FTM4, and the detected maximum value is set as the density of the target pixel (i,j). In the illustrated example, the maximum value is [196], which becomes the pixel value of the target pixel (i,j) in subsequent processing.

FIG. 5 illustrates the concept of the process to extract the smoothed image GF1 and edge image GE1 from the original image GA1. FIGS. 5A through 5C show graphs of images of various types wherein the coordinate position is represented on the horizontal axis, and the pixel value is represented on the vertical axis.

FIG. 5A shows the minimum value/maximum value detection process using circular matrices FTM3 and FTM4 relative to original image GA1, and FIG. 5B shows the obtained smoothed image GF1. In smoothed image GF1, the sharp edges present in the original image GA1 are eliminated by rounding. Thus, similar edges are present throughout the smoothed image GF1, and the image is suitable for fractal image compression.

The edge image GE1 shown in FIG. 5C is an image obtained by subtracting the smoothed image GF1 of FIG. 5B from the original image GA1 of FIG. 5A. Since all components of edge image GE1 have positive values, the compression efficiency is improved when subjecting the edge image GE1 to reversible image processing.

Although the minimum value detection process is executed first in the above examples, it is to be noted that the maximum value detection process may be executed first and the minimum value detection process executed thereafter. In this case, the obtained smoothed image GF has pixel values in all cases equal to or greater than those of the original image GA. In this case, since all components of edge image GE1 have negative values, the compression efficiency is improved when subjecting the edge image GE to reversible image processing. Although a 3-pixel diameter circular matrix is used in this example, it is to be noted that a circular matrix having a diameter of 5 pixels, 7 pixels, 9 pixels or the like may be used.

The minimum value detection process is also called a thinning process or erosion process, the maximum value detection process is also called a thickening process or dilation process, the minimum value/maximum value detection process is also called an opening process, and the maximum value/minimum value detection process is also called a closing process. These processes are also collectively called morphological processes or morphological filters.

Figure 7:
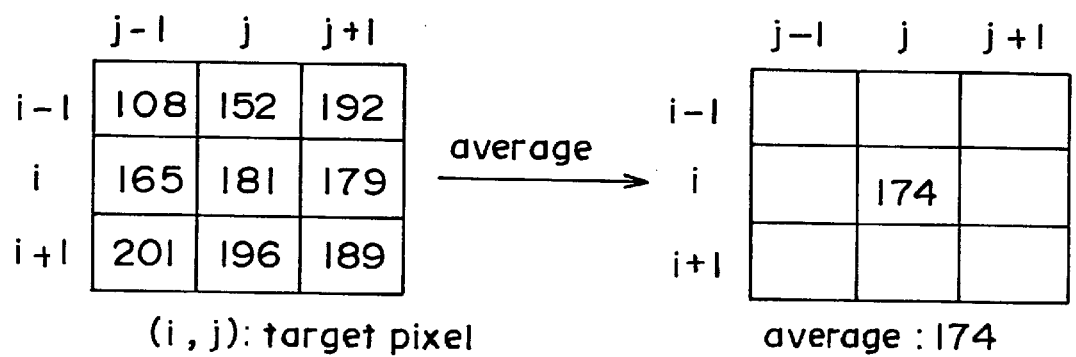
FIG. 7 shows the processing operation of the smoothing filter of FIG. 6.

FIG. 6 shows an example of a smoothing filter FTS1 used as another embodiment of the smoothing process. FIG. 7 illustrates the process of the smoothing filter FTS1 of FIG. 6, and FIG. 8 illustrates the concept of the process for extracting the smoothed image GF2 and the edge image GE2 from the original image GA2 using the smoothing filter FTS1.

Figure 8:
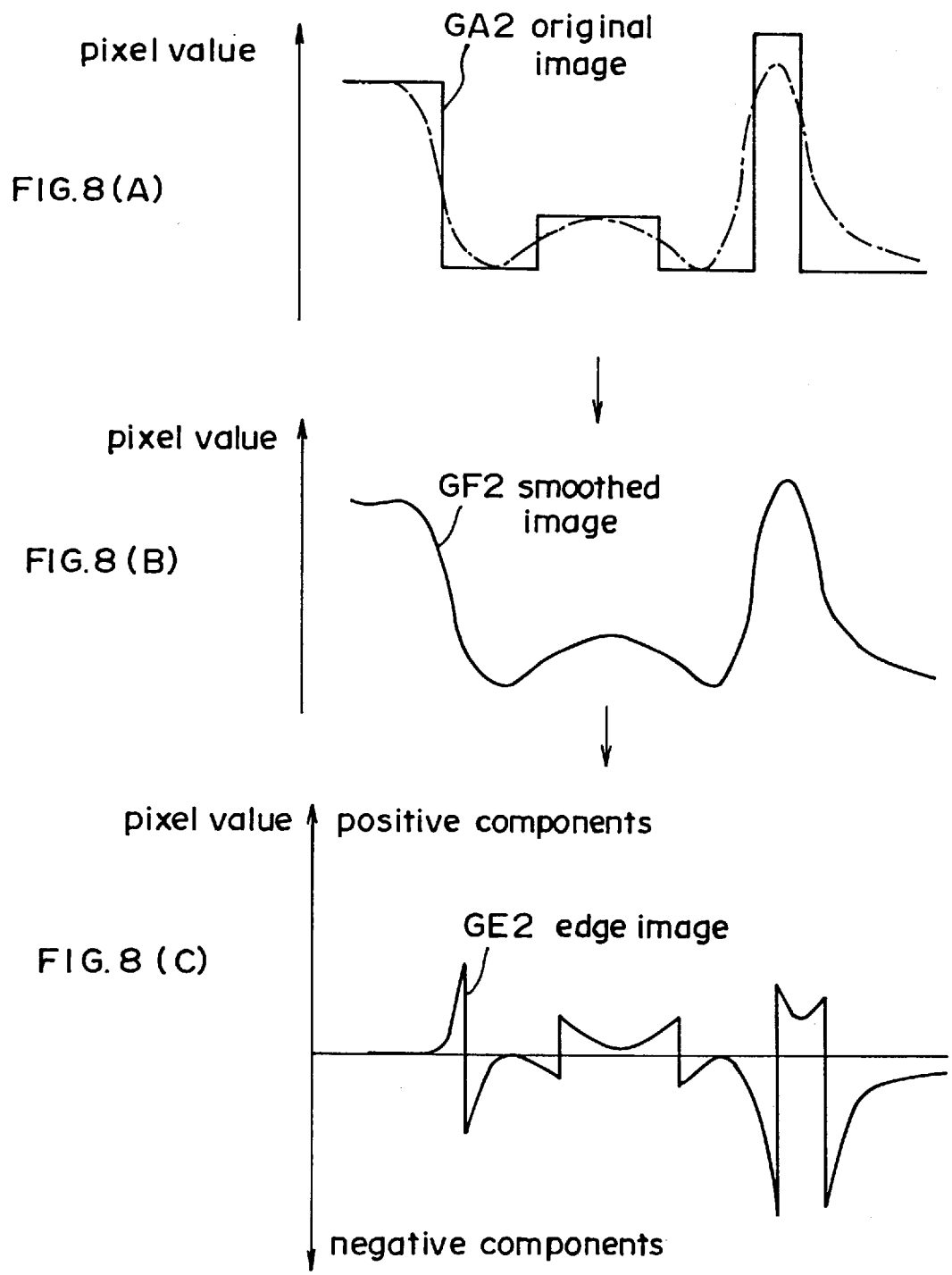
FIGS. 8A, 8B, and 8C illustrate the concept of the process for extracting the smoothed image and edge image from an original image using the smoothing filter.

As shown in FIG. 8, the smoothed image GF2 has pixel values greater than the original image GA2, and the edge image GE2 obtained by subtracting the smoothed image GF2 from the original image GA2 has a mixture of both positive and negative components. Thus, the edge image has worse compression efficiency when subjected to reversible image processing compared to the example of FIG. 5.

Figure 9:
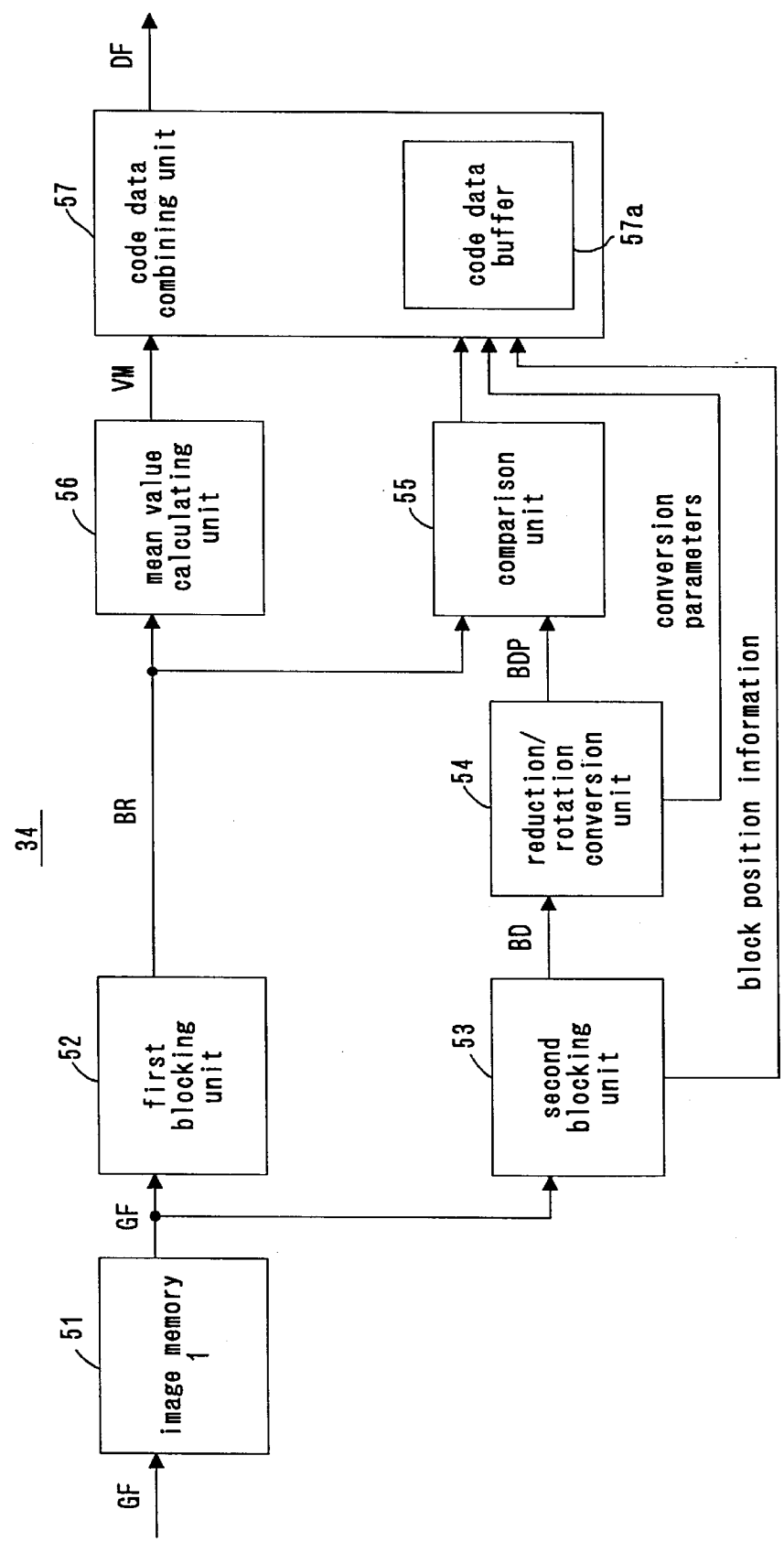
FIG. 9 is a block diagram showing the construction of the fractal encoding unit.
Figure 10:
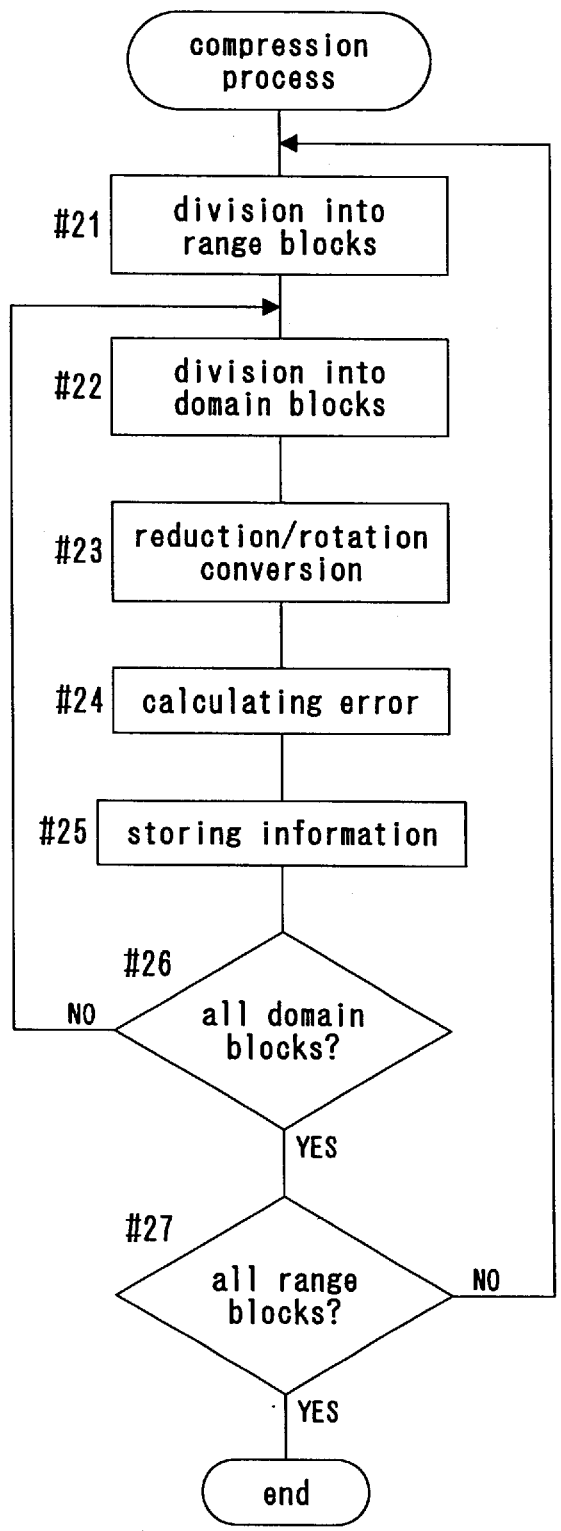
FIG. 10 is a flow chart showing the encoding process of the fractal encoding unit.
Figure 11:
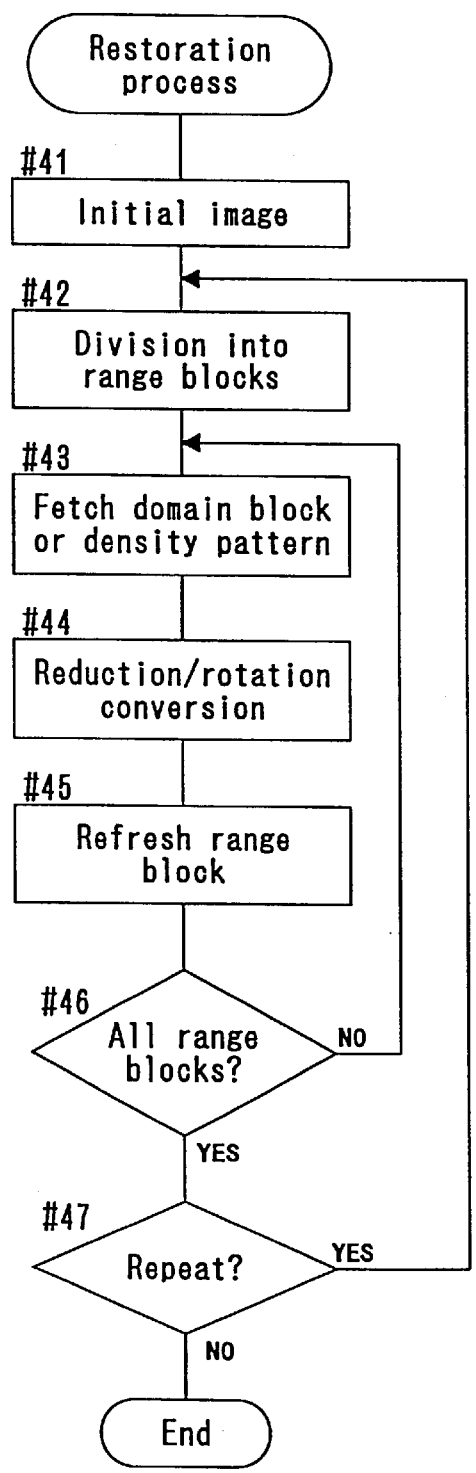
FIG. 11 is a flow chart of the decoding process.

FIG. 9 is a block diagram showing the construction of fractal encoding unit 34, FIG. 10 is a flow chart of the encoding process (compression process) performed by fractal encoding unit 34, FIG. 11 is a flow chart of the decoding process (restoration process), FIG. 12 briefly shows the fractal encoding process, FIG. 13 briefly shows the decoding process of the image compressed by fractal image compression, and FIG. 14 shows the relationship between the domain block BD and the range block BR in the smoothed image GF comprising the original image for fractal encoding. In FIGS. 12 through 14, previously described elements are abbreviated or omitted.

In FIGS. 12 and 14, the smoothed image GF comprising the original image in fractal encoding unit 34 is divided into a plurality of range blocks BR (block size=K×L). Code data DF are sequentially prepared for each of the range blocks BR.

The compression patterns BDP of all domain blocks BD are compared and differences calculated, and the domain block BD and compression pattern BDP having the smallest difference are selected. The average density value VM is calculated for the range blocks BR, and code data DF are prepared based on the calculated mean value VM, position information of the domain block BD with the smallest difference, conversion information of reduction pattern BDP, i.e., reduction ratio (reduction conversion coefficient) α, rotation angle (rotation conversion coefficient) θ, and density conversion Z.

Range block BR is typically a square shape, e.g., 8×8 pixels, 4×4 pixels and the like. Domain block BD is larger than range block BR and of mutually similar shape.

In FIG. 13, the restored image RF is an image restored (expanded) to near the smoothed image GF used as the original image in accordance with repeated restoration processing, and the initial image is generated at the start of the restoration process. The mean value VM of each range block BR including the code data DF is set as the initial image.

In the restoration process, the domain block BD is extracted from the restored image RF based on the position information of domain block BD included in the code data DF. The extracted domain block BD is subjected to reduction conversion using the reduction ratio a included in the code data DF so as to obtain the reduction conversion image BDF. The reduction conversion image BDF is subjected to rotation conversion using the rotation angle θ, and subjected to conversion in accordance with the presence of density inversion Z so as to obtain restored image RFR. The range block BR of the restored image RF is refreshed by the obtained range restored image RFR.

All range blocks BR, i.e., all code data DF are subjected to the aforesaid processing once for a single update of the restored image RF. A restored image RF approaching the original image is obtained by repeating the aforesaid process a number of times. In this way, compression and restoration of an image is accomplished via the restoration conversion encoding method.

In FIG. 9, the fractal encoding unit 34 comprises an image memory 51, first blocking unit 52, second blocking unit 53, reduction/rotation conversion unit 54, comparison unit 55, mean value calculating unit 56, and code data combining unit 57 provided with a code data buffer 57a.

Image memory 51 stores in 1-page units the image data of the smoothed image GF input as an original image in fractal encoding unit 34. The image data of the smoothed image GF is referred to simply as smoothed image GF. The smoothed image GF stored in image memory 51 is read in block units by first blocking unit 52 and second blocking unit 53. As shown in FIG. 14, each domain block BD of the smoothed image GF is read out by second blocking unit 53, and each range block BR is read out by first blocking unit 52.

The second blocking unit 53 reads out the smoothed image GF of each domain block BD from image memory 51, and stores the image data DG of a single read domain block BD. The second blocking unit 53 outputs image data of the stored domain block BD to the reduction/rotation conversion unit 54. The position data (hereinafter referred to as "block position information") in the smoothed image GF of the stored domain block BD is output to code data combining unit 57. The code data combining unit 57 stored the block position information in code data buffer 57a. The block position information includes, for example, the coordinates and number of the domain block in the smoothed image GF.

The first blocking unit 52 reads out the smoothed image GF of each range block BR from image memory 51, and stores the image data of a single read range block BR. These image data are output to comparison unit 55 and mean value calculation unit 56.

The mean value calculation unit 56 calculates a mean value VM of the image data of range block BR output from the first blocking unit 52. For example, a simple mean value of the density of image data, or a mean value of the difference of a density value from a reference value may be used as the mean value VM. The calculated mean value VM is output to code data combining unit 57, and stored in code data buffer 57*a*. The mean value VM is used as an initial image when restoring the image.

The reduction/rotation conversion unit 54 performs reduction conversion on the image data of domain BD output from second blocking unit 53 by a specified reduction ration α, so as to obtain reduction pattern BDP1. Various methods may be used in this reduction conversion, e.g., methods of simply culling pixels of image data, or methods of culling after calculating an average value of two or more pixels. The reduction ratio α is a value required to reduce the domain block BD to the size of the range block BR, e.g., ½, ¼, ⅛, 1/16 and the like.

The obtained reduction pattern BDP1 is subjected to rotation conversion at a specified rotation angle θ. The rotation angle θ comprises four rotation conversions of 0°, 90°, 180°, and 270°, to produce four reduction patterns BDP1 through BDP4. These reduction patterns BDP1 through BDP4 are subjected to density inversion, to produce reduction patterns BDP5 through BDP8. The density inversion is a conversion to reverse black and white. Thus, a total of eight reduction patterns BDP1 through BDP8 are obtained. The obtained reduction patterns BDP1 through BDP8 are sequentially output to comparison unit 55. The reduction ratio α, rotation angle θ, and density inversion data Z used by the reduction/rotation conversion unit 54 are output to code data combining unit 57 as conversion coefficients (conversion parameters), and stored in code data buffer 57*a*. The reduction conversion, rotation conversion, and density inversion are executed as affine transformations.

In comparison unit 55, the difference δ is calculated between the range block BR output from the first blocking unit 52 and each of the respective reduction patterns BDP1 through BDP8 output from the reduction/rotation conversion unit 54. This difference δ is obtained by, for example, calculating the mean square of the density difference of each corresponding pixel.

In code data combining unit 57, the difference δ currently calculated by comparison unit 55 is compared to a minimum difference value δA of the previous cycle. When the current difference δ is smaller than the minimum difference δA, the current block position information and conversion coefficient are substituted as code data corresponding to that stored in code buffer 57*a*. The code data DF is synthesized based on the block position information and conversion coefficient and mean value VM. The code data DF are generated for each range block BR, and sequentially output.

In FIG. 10, the smoothed image GF, which is the encoding object image, is divided into range blocks BR, and a single range block BR fetched (#21). The smoothed image GF is divided into domain blocks BD, and a single domain block BD is fetched (#22). The fetched domain block BD is subjected to reduction conversion, rotation conversion, and density inversion conversion, to obtain eight reduction patterns BDP1 through BDP8 (#23). The difference δ between the range block BR and the reduction patterns BDP1 through BDP8 are calculated (#24), and a reduction pattern BDP having the minimum difference δ is selected, and the conversion parameters and position information of the domain block are temporarily stored in memory (#25). This process is executed for all domain blocks BD (#26), and the conversion parameters of the reduction pattern BDP and the position information of the domain block BD having the minimum difference δ are selected and temporarily stored in memory (#25). The aforesaid encoding process is executed for all range blocks BR (#26).

In FIG. 11, the initial image the same size as the smoothed image GF is the restored image RF (#41). At this time, the mean value VM of each range block BR contained in code data DF is set as the initial value of the respective range blocks BR.

Then, the restored image RF is divided into a plurality of range blocks BR (#42). Then, the image data at the position of the domain block BD corresponding to the range block BR are fetched (#43), and subjected to conversion processing based on the reduction ratio α, rotation angle θ, and density inversion data Z contained in the code data DF (#44). The range restored image RFR obtained by the this process is substituted as the range block BR to refresh the range block BR (#45).

The aforesaid process is executed for all range blocks BR (#46). Thus, a restored image RF is obtained which is nearer to the original image than the initial image. The aforesaid process is repeated a set number of times (#47).

According to the previously described image compression device 1, since a smoothed image GF suitable for fractal image compression is extracted from an original image GA, and subjected to fractal image compression, and other image information is subjected to reversible image compression, excellent restoration characteristics of edge areas are obtained and a reduction of image quality of the restored image is suppressed even when high contrast edge areas are present such as in the case of text images in original image GA.

Image compression device 1A of another embodiment of the invention is described below.

Figure 15:
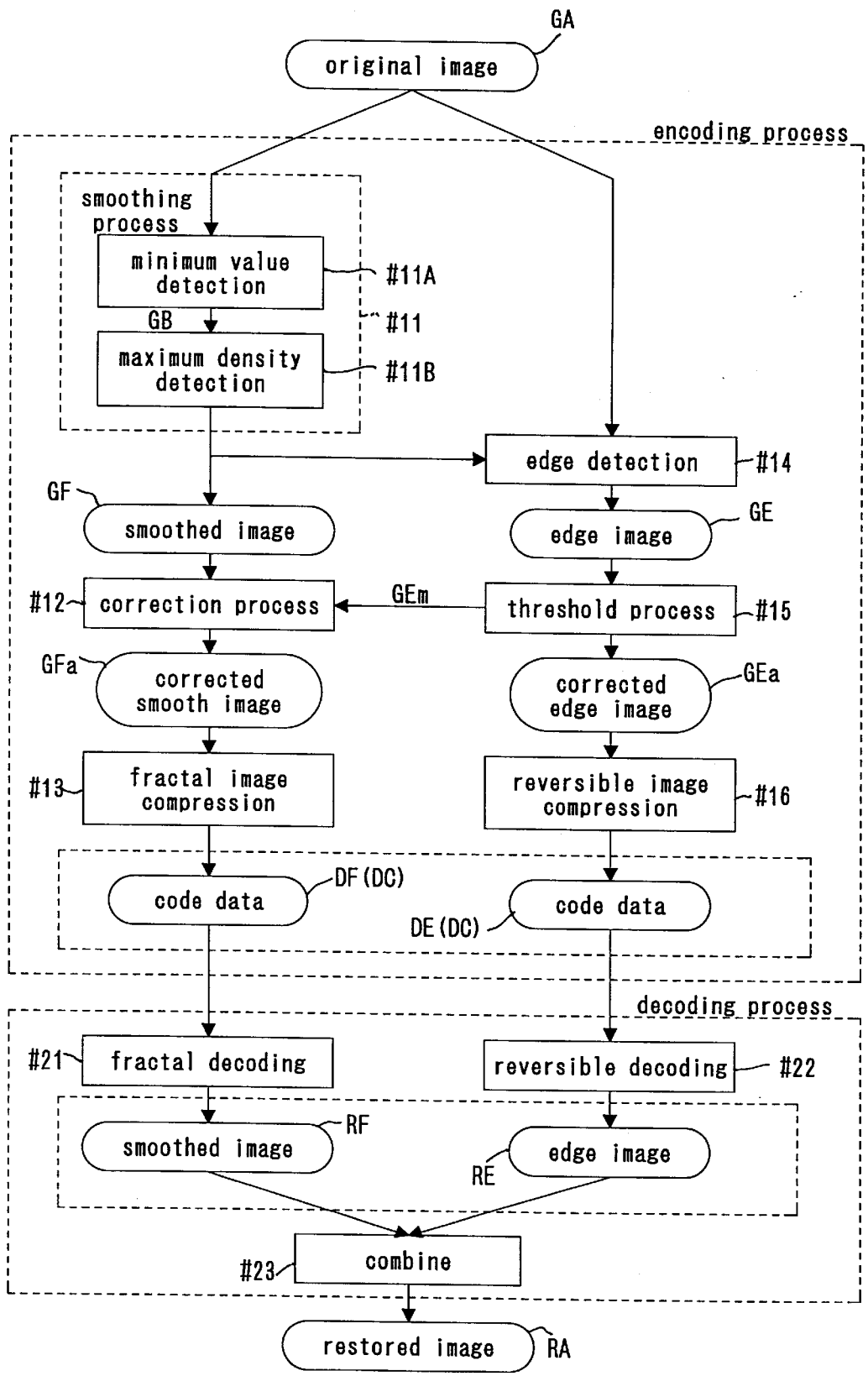
FIG. 15 shows the flow of the encoding process and decoding process of another embodiment of the invention.
Figure 16:
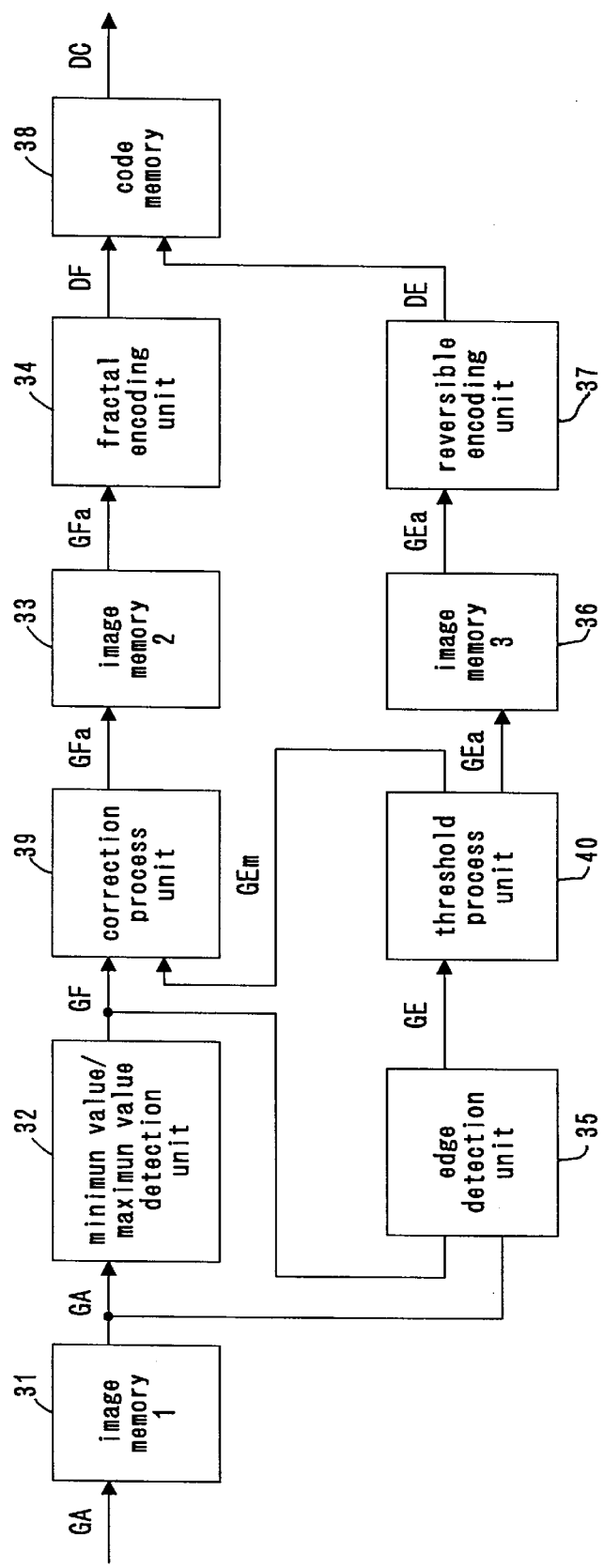
FIG. 16 is a block diagram showing the construction of the image compression device of FIG. 15.

FIG. 15 shows the flow of the encoding process (image compression process) and restoration process (image restoration process) of another embodiment of the invention. FIG. 16 is a block diagram showing the construction of image compression device 1A of FIG. 15, and FIG. 17 illustrates the concept of the threshold process. In these drawings, process content and blocks similar to those of FIGS. 1 and 2 are designated by like reference numbers and omitted or abbreviated in the following description.

In the encoding process of the present embodiment, compression efficiency is improved by adding a correction process relative to the smoothed image GF obtained by performing a smoothing process on original image GA, and edge image GE obtained by an edge detection process.

In FIG. 15, first, each pixel value of edge image GE is subjected to a threshold process using a predetermined threshold value (#15). In this threshold process, a minute edge image GEm comprising pixels having a density value less than a threshold are detected, and corrected edge image GEa is generated which is an image in which the minute edge images GEm have been eliminated from edge image GE. In the threshold process, weak high frequency components are rounded to [0], and compression efficiency is markedly improved when reverse encoding (multi-level run-length method) is executed since the run length of the pixel value [0] is increased.

The minute edge image GEm obtained by the threshold process is added to the smoothed image GF in a correction process (#12). A corrected smooth image GFa is obtained by the correction process. The corrected smooth image GFa is subjected to fractal encoding (#13), and the corrected smooth image GEa is subjected to reversible encoding (#16).

FIG. 16 shows image compression device 1A wherein a correction process unit 39 and threshold process unit 40 is added to the construction of compression image device 1 of FIG. 2.

Correction process unit 39 is a block executing the process of step #12 of FIG. 15 to add the minute edge image GEm to smoothed image GF. Threshold process unit 40 is a block executing step #15 in FIG. 15 to obtain the minute edge image GEm and corrected edge image GEa from edge image GE.

FIG. 17A shows an edge image GE1 identical to that shown in FIG. 5C. A threshold T1 is applied to this edge image GE1, and images comprising pixels having a pixel value smaller than said threshold T1 are designated minute edge image GEm1, and the corrected edge image GEa1 show in FIG. 17B is obtained by eliminating the minute edge image GEml from the edge image GE1. In the corrected edge image GEa1, small high-frequency components are eliminated. Minute edge image GEm are added to smoothed image GF1 shown in FIG. 5B to obtain the corrected smoothed image GFa shown in FIG. 17C.

According to the aforesaid image compression device 1A, image compression at high image quality and high compression efficiency is possible by eliminating weak high-frequency components from edge image GE.

Although eight reduction patterns BDP1 through BDP8 are prepared by the conversion process in the fractal encoding process of the aforesaid image compression device 1, it is to be noted that seven or fewer or nine or more reduction patterns BDP may be prepared. A mirror inversion process may be used as a conversion process. The size of the range block BR and domain block BD may be various sizes other than those stated in the above description. The original image GA may be divided beforehand according to area attributes, and the fractal encoding process may be executed within areas of said attributes. In addition, the construction image compression device 1, in whole or in part, as well as the content of processes, and timing of processes may be variously modified within the scope of the present invention.

Although preferred embodiments of the invention have been described in the foregoing detailed description and illustrated in the accompanying drawings, it will be understood that the invention is not limited to the embodiments disclosed, but is capable of numerous rearrangements, modifications, and substitutions of parts and elements without departing from the spirit of the invention. Accordingly, the present invention is intended to encompass such rearrangements, modifications and substitutions of parts and elements as fall within the scope of the invention.

What is claimed is:

1. An image compression device comprising:

image smoothing means for producing a smooth image by performing a smoothing process on an original image;

edge detection means for producing an edge image by subtracting said smoothed image from said original image;

fractal encoding means for encoding said smoothed image by fractal image compression;

reversible encoding means for encoding said edge image by reversible image compression; and output means for combining the output of said fractal encoding means and the output of said reversible encoding means, and outputting said data as compressed data of the original image.

2. An image compression device claimed in claim 1 wherein said image smoothing means performs a minimum value detection process which sets the minimum density of a target pixel and its surrounding pixels as the target pixel density, and a maximum value detection process which sets the maximum density of the target pixel and its surrounding pixels as target pixel density.

3. An image compression device claimed in claim 1 wherein said fractal encoding means includes a domain block allocation means for dividing the smoothed image into a plurality of domain blocks, a range block allocation means for dividing said smoothed image into a plurality of range blocks having different size from said domain blocks, an area discrimination means for discriminating kinds of images in said range block, a reallocation means for real-locating said range block into smaller range blocks in accordance with the area discrimination results of the area discriminating means, a pattern generating means for converting said domain block to a pattern of same size as said range block allocated by said range block allocation means and reallocation means, an error calculation means for calculating error by comparing said range block and said pattern, and a coding means for coding the smoothed image data by generating a code data which contains information relating to a conversion parameter producing the smallest error in said pattern for the range block and information relating to the position of the domain block having the smallest error in pattern.

4. An image compression device comprising:

image smoothing means for producing a smooth image by performing a smoothing process on an original image;

edge detection means for producing an edge image by subtracting said smoothed image from said original image;

corrected edge image generating means for detecting minute edge images comprising pixels having density values smaller than a predetermined threshold value relative to the density value of each pixel of the edge image, and generating a corrected edge image by erasing said minute edge images from the edge image;

corrected smooth image generating means for generating a corrected smooth image by adding said minute edge images to the smoothed image;

fractal encoding means for encoding said corrected smoothed image by fractal image compression;

reversible encoding means for encoding said corrected edge image by reversible image compression; and output means for combining the output of said fractal encoding means and the output of said reversible encoding means, and outputting said data as compressed data of the original image.

5. An image compression device claimed in claim 4 wherein said image smoothing means performs a minimum value detection process which sets the minimum density of a target pixel and its surrounding pixels as the target pixel density, and a maximum value detection process which sets the maximum density of the target pixel and its surrounding pixels as target pixel density.

6. An image compression device claimed in claim 4 wherein said fractal encoding means includes a domain block allocation means for dividing the corrected smoothed image into a plurality of domain blocks, a range block allocation means for dividing said corrected smoothed image into a plurality of range blocks having different size from said domain blocks, an area discrimination means for discriminating kinds of images in said range block, a reallocation means for reallocating said range block into smaller range blocks in accordance with the area discrimination results of the area discriminating means, a pattern generating means for converting said domain block to a pattern of same size as said range block allocated by said range block allocation means and reallocation means, an error calculation means for calculating error by comparing said range block and said pattern, and a coding means for coding the corrected smoothed image data by generating a code data which contains information relating to a conversion parameter producing the smallest error in said pattern for the range block and information relating to the position of the domain block having the smallest error in pattern.

7. An image compression method comprising the steps of:

producing a smoothed image by performing a smoothing process on an original image;

producing an edge image by subtracting said smoothed image from the original image;

encoding said smoothed image by fractal image compression;

encoding said edge image by reversible image compression;

combining the output of said fractal encoding step and the output of said reversible encoding step; and outputting said data as compressed data of said original image.

8. An image compression method claimed in claim 7 wherein said smoothing process includes a minimum value detection process which sets the minimum density of a target pixel and its surrounding pixels as the target pixel density, and a maximum value detection process which sets the maximum density of the target pixel and its surrounding pixels as target pixel density.

9. An image compression method comprising the steps of:

producing a smoothed image by performing a smoothing process on an original image;

producing an edge image by subtracting said smoothed image from the original image;

detecting minute edge images comprising pixels having density values smaller than a predetermined threshold value relative to the density value of each pixel of the edge image;

generating a corrected edge image by erasing said minute edge images from the edge image;

generating a corrected smooth image by adding said minute edge images to the smoothed image;

encoding said corrected smooth image by fractal image compression;

encoding said corrected edge image by reversible image compression;

combining the output of said fractal encoding step and the output of said reversible encoding step; and outputting said data as compressed data of said original image.

10. An image compression method claimed in claim 9 wherein said smoothing process includes a minimum value detection process which sets the minimum density of a target pixel and its surrounding pixels as the target pixel density, and a maximum value detection process which sets the maximum density of the target pixel and its surrounding pixels as target pixel density.

* * * * *